United States Patent [19]
Morris et al.

[11] Patent Number: 5,724,538
[45] Date of Patent: Mar. 3, 1998

[54] COMPUTER MEMORY ADDRESS CONTROL APPARATUS UTILIZING HASHED ADDRESS TAGS IN PAGE TABLES WHICH ARE COMPARED TO A COMBINED ADDRESS TAG AND INDEX WHICH ARE LONGER THAN THE BASIC DATA WIDTH OF THE ASSOCIATED COMPUTER

[75] Inventors: Dale C. Morris, Menlo Park; Jerome C. Huck, Palo Alto; William R. Bryg, Saratoga, all of Calif.

[73] Assignee: Hewlett-Packard Company, Palo Alto, Calif.

[21] Appl. No.: 607,622

[22] Filed: Feb. 27, 1996

Related U.S. Application Data

[63] Continuation of Ser. No. 44,854, Apr. 8, 1993, abandoned.

[51] Int. Cl.⁶ .................................................. G06F 12/10
[52] U.S. Cl. ............................................ 395/416; 395/417
[58] Field of Search ....................................... 395/416, 417, 395/418

[56] References Cited

U.S. PATENT DOCUMENTS

| | | | |
|---|---|---|---|
| 4,682,281 | 7/1987 | Woffinden et al. | 395/417 |
| 4,727,484 | 2/1988 | Saito | 395/403 |
| 4,731,740 | 3/1988 | Eguchi | 395/417 |
| 5,060,137 | 10/1991 | Bryg et al. | 395/250 |
| 5,253,353 | 10/1993 | Mogul | 395/449 |

*Primary Examiner*—Jack A. Lane
*Attorney, Agent, or Firm*—Howard R. Boyle

[57] ABSTRACT

The present invention relates to the design of computer systems incorporating virtual memory where a virtual page number is longer than the inherent basic data width of the designed computer system. Instead of storing an entire tag in page table entries, a reduced tag is stored. The reduced tag is sized to be no greater in length than the basic computer data width and therefore a single compare operation will ascertain whether there is a match between the reduced tag and the tag stored in a page table entry. To maintain uniqueness of the page table entries, any bits removed from the virtual address to form the reduced tag are used to form an index into the page table.

11 Claims, 7 Drawing Sheets

(PRIOR ART) FIG. 3

COMPUTER MEMORY ADDRESS CONTROL APPARATUS UTILIZING HASHED ADDRESS TAGS IN PAGE TABLES WHICH ARE COMPARED TO A COMBINED ADDRESS TAG AND INDEX WHICH ARE LONGER THAN THE BASIC DATA WIDTH OF THE ASSOCIATED COMPUTER

CROSS REFERENCE TO RELATED APPLICATION

This is a continuation of application Ser. No. 08/044,854 filed on Apr. 8, 1993, now abandoned.

FIELD OF THE INVENTION

The present invention relates to the design of computer systems incorporating virtual memory and more particularly to computers that utilize translation lookaside buffers (TLBs) in the translation of virtual addresses to physical addresses.

BACKGROUND

Conventional computer systems use a technique called virtual memory which simulates more memory than actually exists and allows the computer to run several programs concurrently regardless of their size. Concurrent user programs access main memory addresses via virtual addresses assigned by the operating system. The mapping of the virtual addresses to the main memory or the physical addresses is a process known as virtual address translation. Virtual memory translation can be accomplished by any number of techniques so that the processor can access the desired information in the main memory.

The virtual address and physical address spaces are typically divided into equal size blocks of memory called pages and a page table provides the translation between virtual addresses and physical addresses. Page tables can be organized in a number of structures. "Forward-mapped" tables are most easily accessed using the virtual page number as a pointer to the table entry containing the translation. "Reverse-mapped" tables are most easily accessed using the physical page number as a pointer to the table entry Containing the translation. Since there are many more possible virtual page numbers than physical page numbers, forward-mapped tables can be very large and sparse, but fairly easily searched given the virtual page number. A reverse-mapped table contains one entry for each page of physical memory. Since there are a limited number of physical pages, compared to virtual pages, reverse-mapped tables tend to be more efficient storage structures, but more difficult to access given only the virtual page number.

Each page table entry typically contains the virtual address and/or the physical address, and protection and status information concerning the page. Status typically includes information about the type of accesses the page has undergone. For example, a dirty bit indicates there has been a modification to data in the page. Because the page tables are usually large, they are stored in the main memory. Therefore each regular memory access can actually require two accesses, one to obtain the translation and a second to access the physical memory location.

Many computer systems that support virtual address translation use a translation lookaside buffer (TLB). The TLB is a small, fast, associative memory which is usually situated on or in close proximity to the processor unit and stores recently used pairs of virtual and physical addresses.

The TLB contains a subset of the translations in the page table and can be accessed much more quickly. When the processing unit needs information from main memory, it sends the virtual address to the TLB. The TLB accepts the virtual address page number and returns a physical page number. The physical page number is combined with low-order address information to access the desired byte or word in main memory.

In most cases the TLB cannot contain the entire page table so that procedures need to be implemented to update the TLB. When a virtual page is accessed, the translation for which is not in the TLB, the page table is accessed to determine the translation of this virtual page number to a physical page number and this information is entered in the TLB. Access to the page table can take twenty times longer than access to the TLB and therefore program execution speed is optimized by keeping the translations being utilized in the TLB.

Most computer systems today use some sort of mass storage, typically a disk, to augment the physical random access (RAM) memory in the computer. This augmentation of main memory enables larger programs to be implemented than if only main memory were available. In addition, disk memory is considerably less expensive than RAM but is also hundreds of times slower. Depending on the length of a program and on the competition with other programs for the main memory, part of a program may reside in main memory and part may reside in the disk memory at any particular point in time. The parts of a program that need to be accessed immediately are brought into main memory while the parts not currently used are left in the disk memory.

As an example, if a single program is two mega-bytes long and used with a computer having one mega-byte of main memory, then there will be two mega-bytes of virtual addresses used by the program. Since the main memory can only hold one mega-byte of information, the remaining one mega-byte of program information would be stored in the disk memory system. So at any one time half of the virtual address can and cannot be mapped to program information in main memory as half of the program fills the available physical memory. The access to the information in main memory occurs normally. That is, the TLB is looked to first to see if it has the translation and if not then the TLB is updated from information in the page table and then the TLB is again referenced to get the translation information.

If access to the information that is not in the main memory occurs, then the TLB is looked to first for the translation which will not be there. Then the page table is referenced to get the translation information to update the TLB. However the page table only has the translations for information in the main memory and therefore will not have the required translation information. This condition is called a page fault. In response to a page fault, the virtual page that is referenced is assigned a physical page and this information is inserted into a page directory. If all physical pages have already been associated with other virtual pages, then a page fault handler needs to select which of the physical pages to reassign to the virtual address page currently being referenced. There are many algorithms for such a choice such as first-in-first-out and least-recently-used algorithms. The page fault handler is typically implemented in software while the TLB update process can be handled either by hardware or software as is well known in the industry.

FIG. 1 illustrates the process described above. In step 112 a virtual address is presented to the TLB. If the translation for that virtual address is in the TLB (TLB hit), then the associated physical address is derived from the TLB and is utilized to access physical memory (step 114). If the translation for that virtual address is not in the TLB (TLB miss), then the translation for that virtual address is looked up in the page directory/table (step 116). If the translation is in the page directory, then this information is inserted in the TLB (step 118) and the virtual address is again presented (step 112). This time there will be a TLB hit so that the resulting physical address is used to access physical memory.

If the virtual address is in a page of virtual addresses for which no page of physical addresses is associated, then there will be no entry for this page in the page directory and a page fault will occur. In this situation, a software page fault handler (step 120) will assign a physical page to the virtual page and update the page table. Then the virtual address is again presented to the TLB and the TLB does not yet have the translation so there will be a TLB miss and the TLB will be updated from the page directory. Then the virtual address is again presented to the TLB and this time a TLB hit is assured so that the resulting physical address is used to access physical memory.

FIG. 2 illustrates a simplified method of accessing an entry in a translation lookaside buffer (TLB) in response to the presentation of a virtual address. For illustration purposes, the illustrated TLB has only one entry whereas a TLB would normally have many more entries. The virtual address is loaded into a register 201. This virtual address is composed of two parts a virtual page number 203 and a physical offset 205. The physical offset 205 is normally the lower 12 bits (bits 11-0) of the address which specify a particular byte within a page. The remaining bits in the register indicate the virtual page number.

The term "page offset" is a term often used in the industry and is synonymous with the term "physical offset" used in describing the present invention. Other bits are often used in uniquely specifying a translation to a physical page number. Such bits include "address space identifier" bits, for example. However, for the purposes of the present invention, all such bits will be considered part of the virtual page number.

For the example illustrated, the virtual page number becomes the virtual tag which supplies one input for the TLB comparator 207. A TLB 209 has two linked parts, a TLB tag 211 and an associated physical page number 213. The TLB tag 211 supplies the second input to the TLB comparator 207 and the comparator compares the TLB tag to the virtual tag. If the tags match, then the comparator indicates a TLB hit and the physical page number 213 is combined with the physical offset 205 to provide the physical (real) memory address. If the tags do not match, then there has been a TLB miss and the TLB miss process described in association with FIG. 1 is employed to update the TLB.

FIG. 3 illustrates the process of retrieving the physical page information given the virtual page number as would be required to update the TLB after a TLB miss. As described above, the virtual to physical mappings are maintained in a page table. For translating a given virtual address to a physical address, one approach is to perform a many-to-one function (hash) on the virtual address to form an index into the page table. This gives a pointer to a linked list of entries. These entries are then searched for a match. To determine a match, the virtual page number is compared to an entry in the page table (virtual tag). If the two are equal, that page table entry provides the physical address translation.

In the example illustrated, a hash function 301 is performed on the virtual page number 203 to form an index. This index is an offset into the page table 303. As shown, the index is 0, that is, the index points to the first entry 305 in the page table. Each entry in the page table consists of multiple parts but typically contains at least a virtual tag 307, a physical page 309 and a pointer 311. If the virtual page number 203 equals the virtual tag 307, then physical page 309 gives the physical (real) memory page address desired. If the virtual tag does not match, then the pointer 311 points to a chain of entries in memory which contain virtual to physical translation information. The additional information contained in the chain is needed as more than one virtual page number can hash to the same page table entry.

As shown, pointer 311 points to a chain segment 313. This chain segment contains the same type of information as the page table. As before, the virtual page number 203 is compared to the next virtual tag 315 to see if there is a match. If a match occurs then the associated physical page 317 gives the address of the physical memory page desired. If a match does not occur, then the pointer 319 is examined to locate the next chain segment, if any. If the pointer 319 does not point to another chain segment, as shown, then a page fault has occurred. A page fault software program is then used, as described in association with FIG. 1, to update the page table.

The above described method works well for systems where the virtual TAG is less than the basic datapath size of the computer or in systems having only one central processing unit (CPU). However if the virtual TAG is larger than the datapath size, then two compares are required to test if the virtual TAG and the virtual page number are the same. This additional compare step reduces the speed of the computer system. In addition, in systems utilizing multiple CPUs, great care must be taken to insure that one CPU does not update the same page table entry that another CPU is testing. Otherwise it is possible for a first CPU to modify a page table entry while a second CPU is performing the second compare step on the same page table entry. This is an unacceptable result and therefore additional hardware would be required to insure conflicts do not occur.

What is needed in the industry is a method and apparatus that allows for virtual tags which are larger than the basic datapath of the computer system without requiring multiple compare steps when testing an entry in the page table.

SUMMARY OF THE INVENTION

The present invention provides a method and apparatus for utilizing virtual tags larger than the basic computer datapath without requiring multiple compare operations instead of storing the entire tag in the page table entries, multiple comparisons are avoided by storing a reduced tag. The reduced tag is no larger than the basic datapath size, so only a single compare operation is needed. The reduced tag is formed from the system virtual address by removing some of the bits thereby forming a smaller tag. To maintain uniqueness of the page table entries, the bits removed from the virtual address are used to form an index into the page table.

In a second preferred embodiment, the bits not used to form the reduced tag are combined with other bits from the virtual address to form a hashed index. This hashed index provides for an even distribution of entries in the page table.

In a third preferred embodiment, a hashed tag is formed from the virtual page number bits and the index bits. This hashed tag is no bigger than the basic data width of the computer and is stored in the page table in place of the reduced tag. An index into the page table is designed to maintain the uniqueness of the page table entries.

DETAILED DESCRIPTION OF THE INVENTION

A basic feature of the present invention is the splitting up of the virtual page number 203 into two parts. A first part which becomes the reduced tag and a second part which is used as an index. The reduced tag is formed by limiting the bits used for the tag to no more than the width of the basic computer data path. For example, if the computer system has a data width of 32 bits, then the reduced tag would contain no more than 32 bits. Any bits that are not used to form the reduced tag are then used to form a remainder index.

Figure 4:
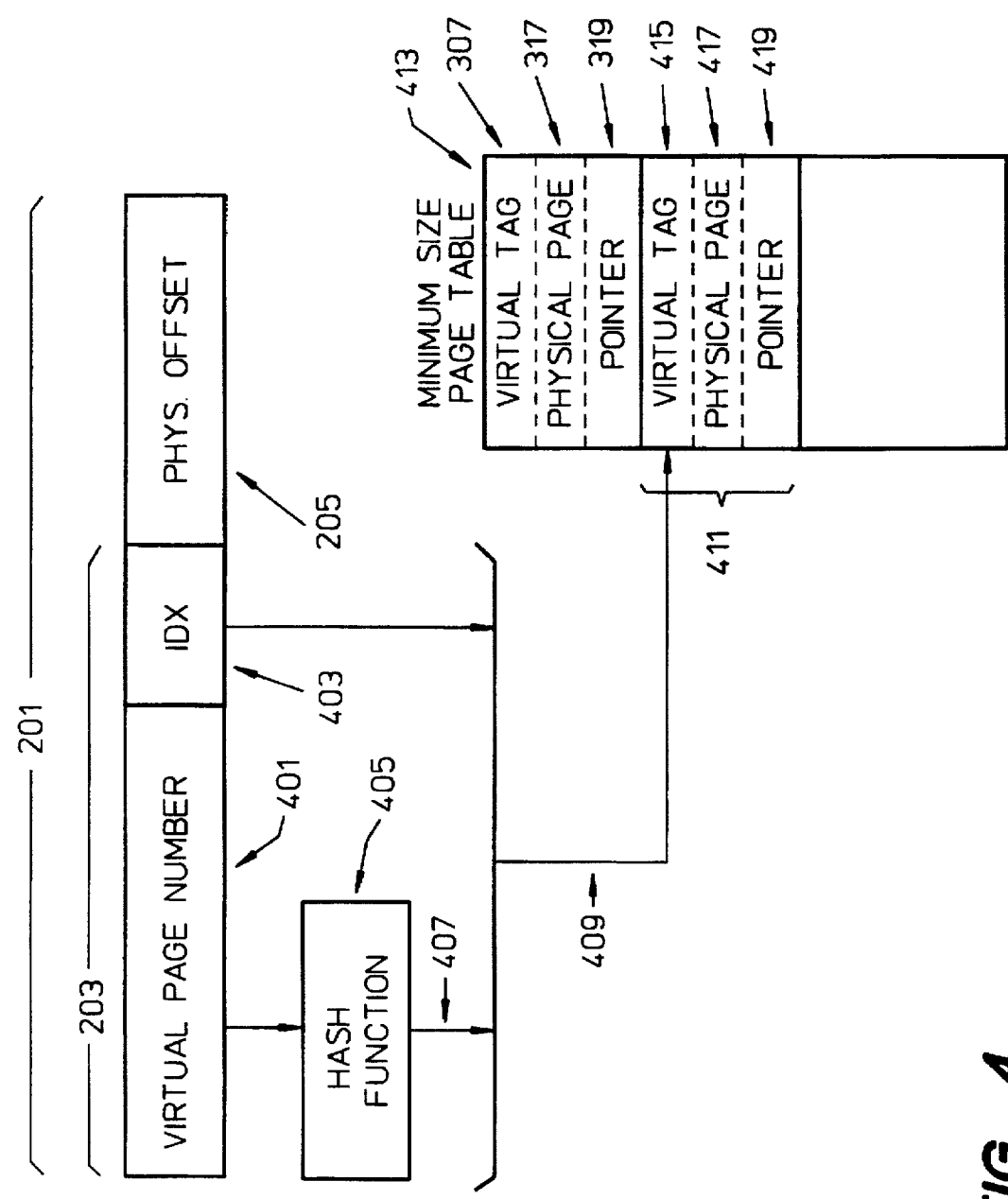
FIG. 4 illustrates a first preferred embodiment of the present invention where index bits are combined with a hashed tag to provide access to the page table.

FIG. 4 illustrates a preferred implementation of the present invention for retrieving the physical page information after a TLB miss. As illustrated, the virtual page number 203 is split into two parts; a reduced tag 401 and a remainder index 403. The reduced tag 401 consists of no more bits than the basic data width of the computer. Bits not used to form the reduced tag form the remainder index 403. So if the virtual page number 203 was 36-bits in length, then the reduced tag 401 would be 32-bits long and the remainder index 403 would be 4-bits in length assuming a 32-bit computer data width.

A hash function 405 is performed on the reduced tag 401 to produce a tag index 407. The tag index 407 is combined with the remainder index 403, for example by concatenation, to form a page table index 409. As shown, the page table index is 1 and points to the second entry 411 of the page table 413. Each entry in the page table consists of multiple parts as was previously described in association with FIG. 3. If the reduced tag 401 equals the reduced tag 415, then physical page 417 gives the physical (real) memory page address desired. If the tags 401 and 415 do not match, then the pointer 419 is examined to find the next link in the chain, if any, as was previously described.

This method and apparatus requires the page table to have a minimum number of indices. In this example, since the remainder index 403 is 4-bits in size, the page table must have at least 16 entries. However since page tables are typically much greater in size than this, this constraint does not pose a problem.

Figure 5:
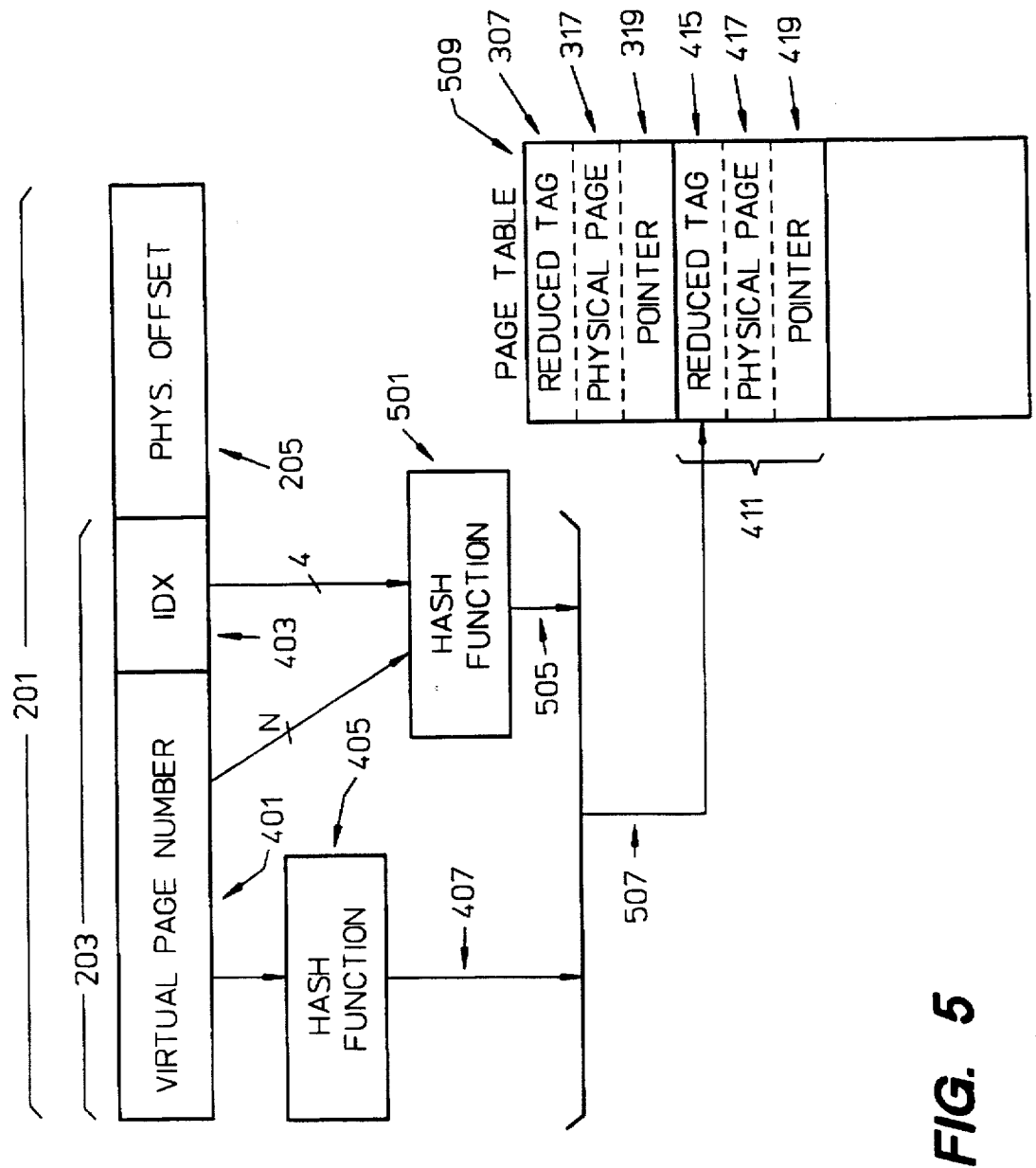
FIG. 5 illustrates a second preferred embodiment of the present invention where hashed index bits are combined with a hashed tag to provide access to the page table.

FIG. 5 illustrates a second preferred implementation of the present invention. As before, the virtual page number 203 is split into a reduced tag 401 and a remainder index 403. The reduced tag 401 is as wide as the basic data width of the computer. Bits not used to form the reduced tag form the remainder index 403. In the example shown the remainder index is 4-bits long and the reduced tag 401 is 32-bits long.

The 32-bits of the reduced tag 401 are processed by a hash function 405 to produce a tag index 407. A second hash function 501 is performed on the remainder index 403 and "n" bits 503 from the virtual tag 401 where "n" can be 0 to the maximum number of bits in the reduced tag. The output 505 of the second hash function 501 is combined with the tag index 407, for example by concatenation, to form a page table index 507.

By using a second hash function 501, a more even distribution of page table indexes is possible than if only the remainder index 403 bits were used. Ideally the distribution would be such that the first index into the page table would result in a hit. Due to page table size constraints however, a search length into the table of 1.1 is more typical and allows for a reasonable page table size.

Figure 1:
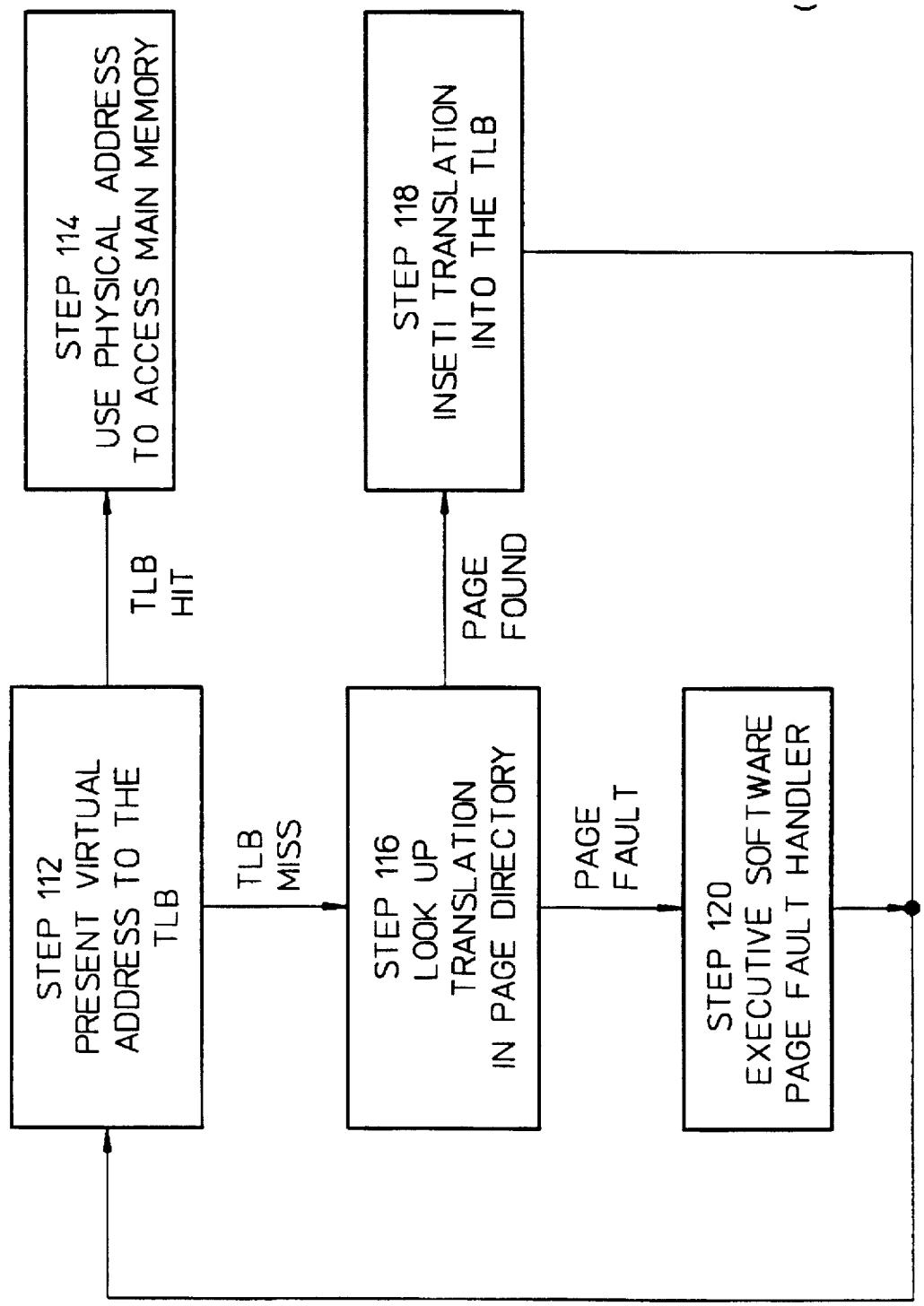
FIG. 1 illustrates a prior art procedure for responding to virtual addresses that are presented during execution of a program.
Figure 2:
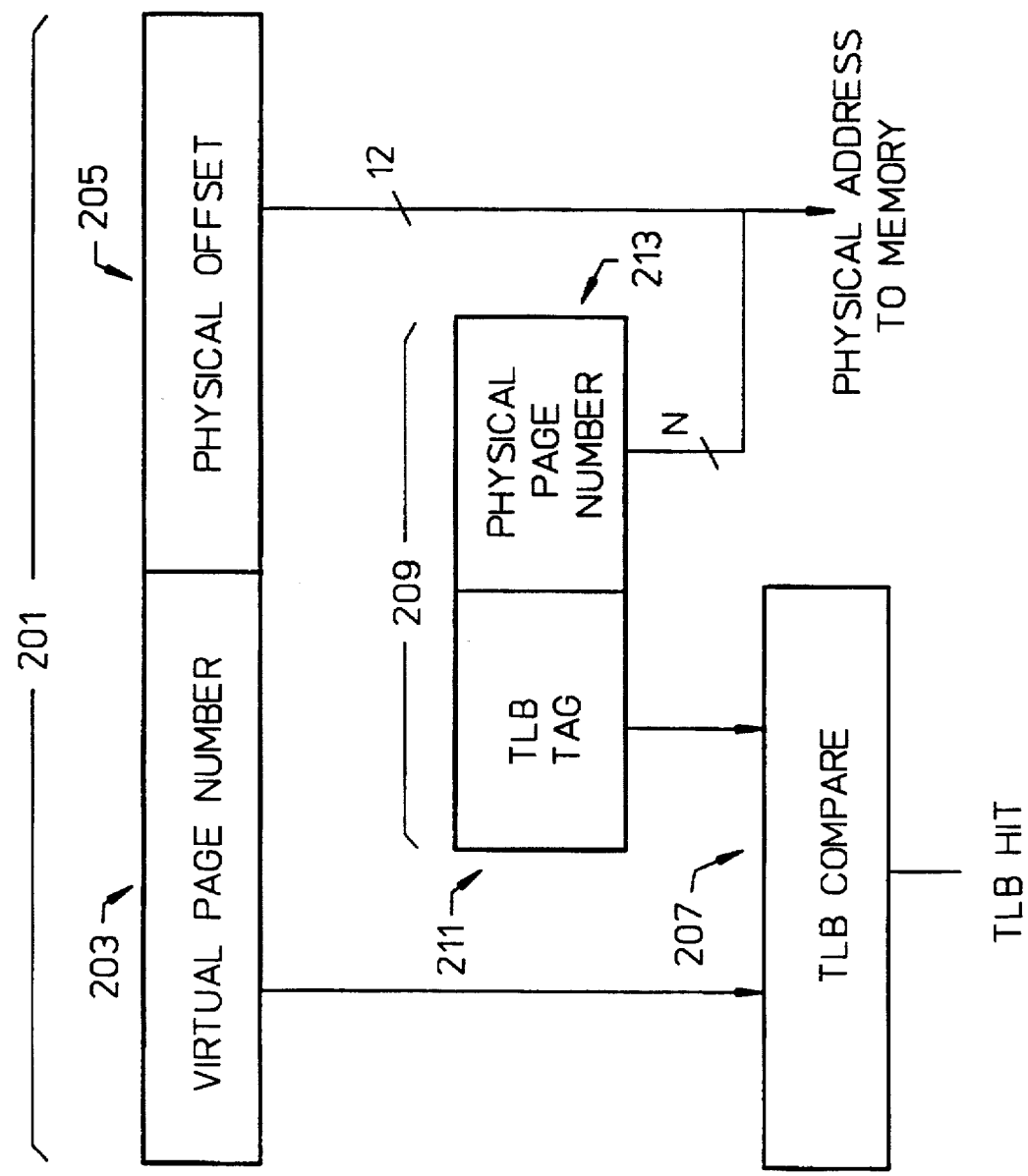
FIG. 2 illustrates a prior art method of accessing an entry in a translation lookaside buffer.
Figure 3:
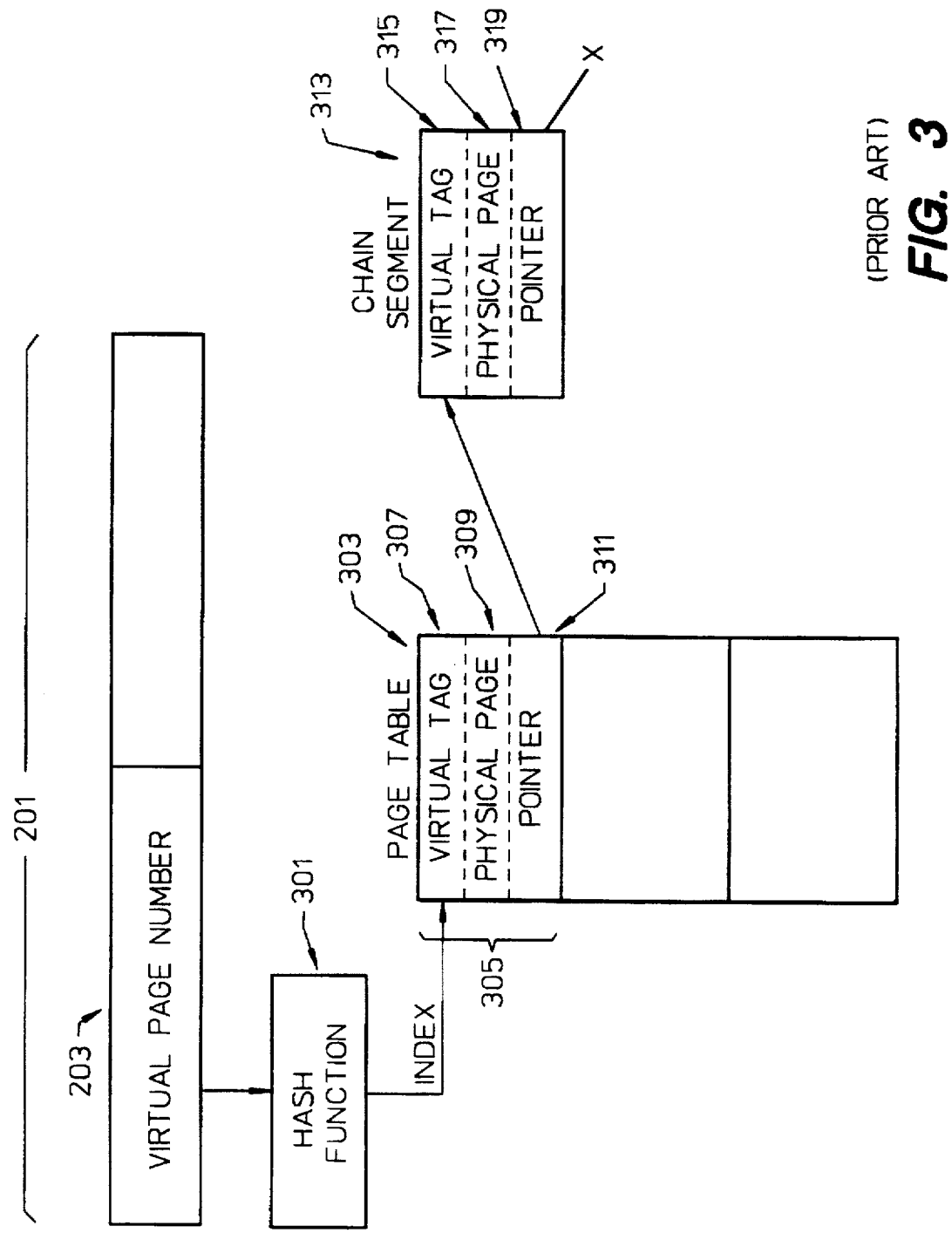
FIG. 3 illustrates a prior art method of retrieving physical page information to update a TLB after a TLB miss.

The organization and function of the page table 509 is essentially as described in association with FIGS. 3 and 4. However the size of the page table is determined by the number of bits in the output 505 of the second hash function. At a minimum, the output 505 will consist of the number of bits in the remainder index 403. In the minimum case where the remainder index is four bits long and "n"=0, the page table will have 16 entries and will function as described in association with FIG. 4. If "n">0 then the output 505 will be greater than 4-bits and the page table will have $2^m$ entry spaces where m is the number of bits in the output 505. There is not necessarily a direct relationship between "n" and "m" as the second hash function can take any number of bits from the reduced tag and produce one or more additional bits to combine with the remainder index 403 bits. The more bits in the output 505, the more evenly distributed are the pages in the page table.

The "n" bits from the reduced tag can be software configurable such that the number of bits, and the particular bits used, can be selected by software. This allows for the smart configuration of the computer system which is desirable if the virtual address 203 is much larger than the datapath size and therefore the constraints on the page table size becomes a problem.

Figure 6:
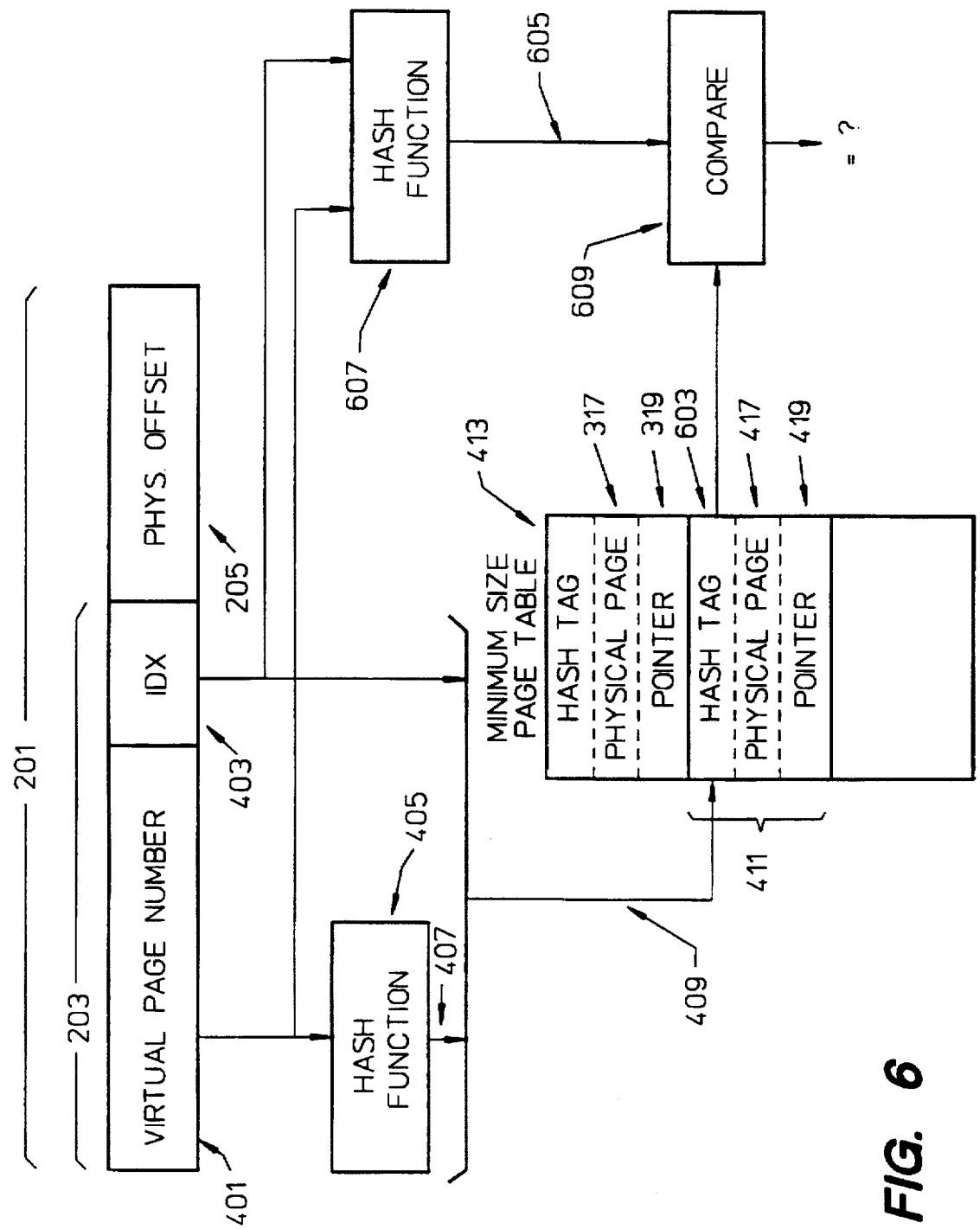
FIG. 6 illustrates a third preferred embodiment of the present invention where hashed tags are stored in the page table.

FIG. 6 illustrates an additional embodiment of the present invention. The operation of the page table lookup process is essentially the same as described in association with FIG. 4 with the following exceptions.

The page table 413 contains "hash tags" 601 and 603 instead of the reduced tags of FIG. 4. These hash tags are formed by taking the index bits 403 and the virtual page number bits 401 and performing a hash function on the bits with the result being no larger than the basic data width of the computer. This hash result is then stored in the page table (601 & 603) in place of the reduced tags described before.

In operation, a page table index 409 is formed as previously discussed. Concurrent with the page table index formation, a hash result 605 is formed by performing a hash function 607 on the index bits 403 and the virtual page number bits 401. This hash function is the same as that used to generate all the hash tags which were stored in the page table. The page table index points to an entry 411 in the page table 413 and the hashed tag 603 is compared 609 to the hash result 605. If the tag 603 and the result 605 match then physical page 417 gives the physical memory page address desired. If there is no match, then the pointer 419 is examined to find the next link in the chain, if any.

This method and apparatus of generating a page table tag is particularly advantageous when the computer operating system can assure that the high order bits in the virtual page number are zeros. For example, if the entire virtual address space is not needed, then some bits can always be zero. This method and apparatus also permits a reduction in the size of the IDX index which improves the efficiency of the page table as the page table minimum size is reduced.

Figure 7:
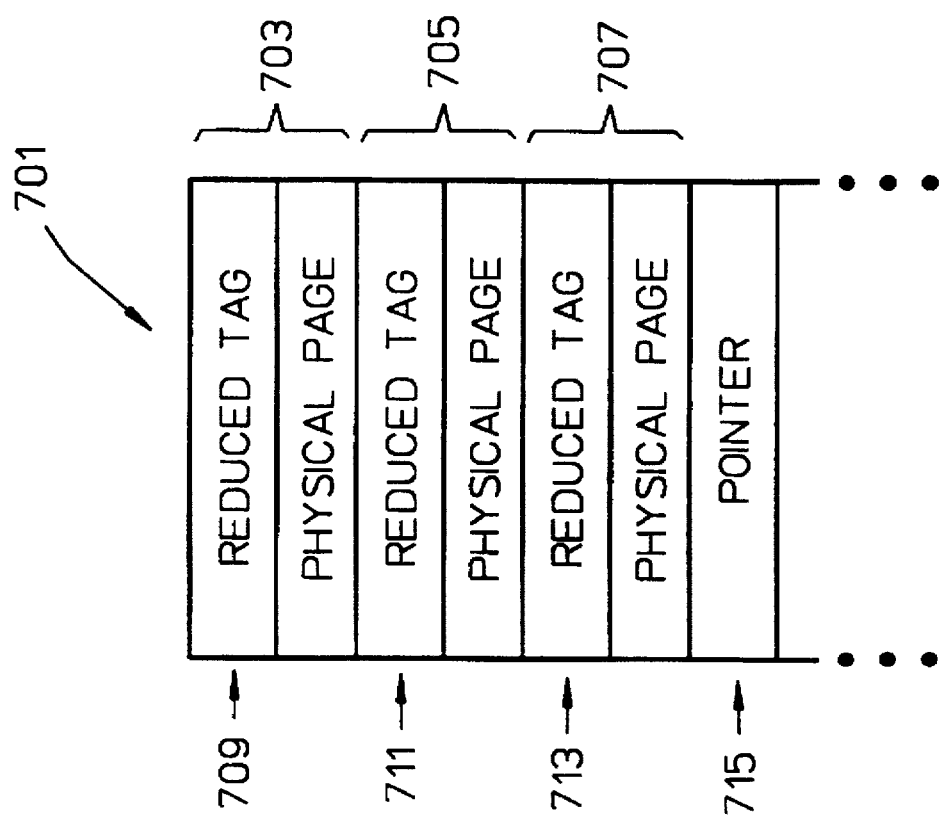
FIG. 7 illustrates an alternate page table format.

FIG. 7 illustrates one of many possible alternate page table organizations which are useful without departing from the scope of the present invention. In this example, one entry 701 in a page table is shown. This entry has three sets (703, 705 and 707) of reduced tags and physical page entries. The operation of this page table is essentially the same as described in association with FIG. 4 except that three reduced tags (709, 711 and 713) are compared to the virtual page number 401 before the pointer 715 is examined to find the next link, if any.

The above preferred embodiments described all have the advantage of allowing large virtual addresses to be used while eliminating the need for multiple compare steps. Therefore computers implementing the present invention will enjoy the advantages of a large address space without the performance penalties and problems associated with prior art designs. This is a particularly important advancement for high performance computer systems employing multiple CPU each with access to a common physical memory.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

We claim:

1. A computer apparatus having a basic data width, incorporating virtual memory to physical memory translation apparatus of the type having a TLB and a page table, comprising:

a first storage means storing a virtual tag wherein the number of bits in the virtual tag exceeds the basic data width of the computer;

the virtual tag having a reduced tag section wherein the number of bits in the reduced tag section is equal to, or less than, the basic data width of the computer;

the virtual tag having an index section including the virtual tag bits excluded from the reduced tag section;

a hash function operative to produce an output string of bits from the reduced tag bits;

a page table index including said output string bits combined with said index section bits; and a page table including a reduced tag entry, where the reduced tag entry is a reduced tag, and an associated physical page address;

wherein after a TLB miss, the page table points to a page table reduced tag entry which is compared to the reduced tag entry of the virtual tag.

2. An apparatus as in claim 1 wherein the page table includes $2^I$ reduced tag entries where "I" equals the number of bits in the index section.

3. An apparatus as in claim 1 wherein the page table also includes a pointer entry which points to a chain of entries and the chain of entries includes a reduced tag entry.

4. A computer apparatus for updating information in a translation look-aside buffer (TLB) comprising:

a first storage means storing a virtual address wherein the virtual address includes a reduced tag field, an index field and a physical offset field;

a hash function means for hashing the information in the reduced tag field and producing a tag index output;

a page table index including the tag index and the information in the index field where the page table index points to a reduced tag entry in a page table;

a comparator that compares the information in the reduced tag entry to the information in the reduced tag field and if the information in the reduced tag entry and the reduced tag field match, the physical page entry associated with the reduced tag entry and the virtual address associated with the reduced tag entry are stored in the TLB; and wherein the reduced tag field and the size of the reduced tag entry are equal to, or less than, a basic data width of the associated computer and the reduced tag field plus the index field is larger than the basic data width of the associated computer.

5. An apparatus as in claim 4 wherein:

the page table index includes the tag index and an output from a second hash function; and a first input to the second hash function includes all the information in the index field and a second input to the second hash function includes 1 bit of information from the reduced tag field.

6. A computer-based apparatus for handling translation lookaside buffer (TLB) misses, the apparatus comprising:

a physical memory means for storing pages of data, the pages of data accessed via a virtual address;

a TLB for storing address translation information for translating the virtual addresses to physical addresses of the data in the physical memory;

a TLB miss handler, coupled to the TLB, adapted to hash information in a first field within the virtual address, where this first field is equal to, or less than, a basic data width of the associated computer, to form a tag index and this tag index is combined with information in a separate second field within the virtual address to form an offset pointer into a page table, wherein said separate second field comprises virtual bits of said virtual address excluded from said first field; and the TLB handler is further adapted to compare page table information pointed to by the offset pointer with the information in the first field within the virtual address and if there is a match, then the TLB miss handler causes information from the page table to be stored in the TLB.

7. An apparatus as in claim 6 wherein the TLB miss handler is further adapted to hash the information in the separate second field plus one bit of information from the first field and thereby form a hash index output which is combined with the tag index to form the offset pointer.

8. An apparatus as in claim 7 wherein the page table includes $2^I$ translation entries where "I" equals the number of bits in the hash index output.

9. A computer apparatus for updating information in a translation look-aside buffer (TLB) comprising:

a first storage means storing a virtual address wherein the virtual address includes a reduced tag field, an index field and a physical offset field;

a first hash function for hashing the reduced tag field and producing a tag index output;

a page table index including the tag index and the index field where the page table index points to a hashed tag entry in a page table;

a second hash function for hashing the virtual address and thereby producing a hash result; and a comparator that compares the hashed tag entry to the hash result and if the hashed tag and hash result match, the physical page entry associated with the hashed tag entry is stored in the TLB.

10. An apparatus as in claim 9 wherein the page table includes $2^I$ hashed tag entries where "I" equals the number of bits in the index section.

11. An apparatus as in claim 9 wherein the hashed tag is equal to a basic data width of a computer the hashed tag is associated with.

* * * * *